(12) United States Patent
Sakai et al.

(10) Patent No.: US 7,752,405 B2
(45) Date of Patent: Jul. 6, 2010

(54) DATA RECORDING APPARATUS, PROGRAM PRODUCT, AND DATA RECORDING METHOD

(75) Inventors: Motohiro Sakai, Kawasaki (JP); Kazuma Takatsu, Kawasaki (JP); Akira Satou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 587 days.

(21) Appl. No.: 11/785,898

(22) Filed: Apr. 20, 2007

(65) Prior Publication Data

US 2008/0022060 A1  Jan. 24, 2008

(30) Foreign Application Priority Data

Jul. 20, 2006  (JP) .............................. 2006-198624

(51) Int. Cl.
*G06F 12/16* (2006.01)
(52) U.S. Cl. ........................................ 711/162; 707/640
(58) Field of Classification Search ........................ None
See application file for complete search history.

(56) References Cited

U.S. PATENT DOCUMENTS

2005/0069292 A1  3/2005  Yokota et al.

2006/0064441 A1  3/2006  Yamamoto

FOREIGN PATENT DOCUMENTS

| CN | 1564973 | 1/2005 |
|---|---|---|
| CN | 1752947 | 3/2006 |
| EP | 1 517 229 | 3/2005 |
| JP | 2004-522217 | 7/2004 |
| JP | 2005-275674 | 10/2005 |
| WO | WO 02/35352 A2 | 5/2002 |
| WO | WO 02/35352 A3 | 5/2002 |

OTHER PUBLICATIONS

Office Action issued Sep. 19, 2008 in corresponding Chinese Patent Application No. 2007101038754.

*Primary Examiner*—Jack A Lane
(74) *Attorney, Agent, or Firm*—Staas & Halsey LLP

(57) ABSTRACT

A data recording apparatus includes a determining unit that determines whether a storable area is present in the first storage device. The storable area is a combination of a plurality of empty areas having contiguous physical addresses with a total data volume larger than that of a volume of the data. When the determining unit determines that the storable area is present, a first storage unit stores the data in the storable area, and a second storage unit stores the data that has been stored by the first storage unit in the storable area as a lump into the second storage device.

12 Claims, 12 Drawing Sheets

DATA RECORDING APPARATUS, PROGRAM PRODUCT, AND DATA RECORDING METHOD

CROSS REFERENCE TO RELATED APPLICATIONS

This application claims the benefit under 35 U.S.C. Section 119 of Japanese Patent Application No. 2006-198624, filed Jul. 20, 2006, which is hereby incorporated by reference in it's entirety into this application.

BACKGROUND OF THE INVENTION

1. Field of the Invention

The present invention relates to a technology for storing the same data in a plurality of storage devices.

2. Description of the Related Art

The various data used in computer systems are generally recorded on storage devices such as disk device. Usually, over time, the data recorded on the storage device are likely to be used less frequently. As keeping such unused or less used data in the storage device is expensive, a backup of the data from the storage device needs to be taken on removable media and the storage device needs to be freed by deleting the data, pushing up the cost in terms of employing operators for performing these processes. Therefore, to make the system cost-effective, an autonomous system needs to be in place to take a backup of data and delete the data.

Therefore, hierarchical storage management employs a virtual disk device that archives data autonomously without consuming resources of the host and that presents to the host a transparent disk storage space obviating the need for removable media. The virtual disk device manages user data in previously set blocks (block lengths).

Japanese Patent Laid-Open Publication No. 2005-275674 discloses a technology whereby a backup can be taken efficiently by adjusting the data length transferred at a time from the storage device to the removable media such as a magnetic tape device.

However, in the conventional virtual disk device, which manages user data in previously set block lengths, a backup of data is taken in block lengths. Therefore, if a large volume of data is involved, overhead occurs in the tape disk, hampering efficient backup process.

In other words, if the volume of the user data is not very much and amounts to one block length, all the data can be written to the tape device in one go. However, it takes several times to write the entire data to the tape device if the volume of the user data is such that the data needs to be managed in several blocks. One file mark is written after every block of data is written to the tape. As the tape device cannot be accessed when the file mark is being written, there is a waiting period before the next block can be written to the tape device when the next block of data is moved to the write position.

Thus, the number of waiting periods due to the tape device overhead increases with the volume of the data, adversely affecting the performance. This is equally applicable when reading user data from the tape device. To improve performance, therefore, one can consider reducing the number of times file marks is written by enabling varying the number of blocks of data according to the volume of data. However, user data can vary vastly in size and a single block length and it is not possible to determine a single block length that will work for all the volumes of data.

In other words, an efficient backup process needs to be devised that works for any data volume, thus improving the performance of the virtual disk device.

SUMMARY OF THE INVENTION

It is an object of the present invention to at least partially solve the problems in the conventional technology.

According to an aspect of the present invention, a data recording apparatus that stores same data in a first storage device and a second storage device, the first storage device and the second storage device being formed of a plurality of areas each having a data volume, includes a determining unit that determines whether a storable area is present in the first storage device, the storable area being a combination of a plurality of empty areas having contiguous physical addresses with a total data volume larger than that of a volume of the data; a first storage unit that stores the data in the storable area; and a second storage unit that stores the data that has been stored by the first storage unit in the storable area as a lump into the second storage device.

According to another aspect of the present invention, a method of recording same data in a first storage device and a second storage device, the first storage device and the second storage device being formed of a plurality of areas each having a data volume, includes determining whether a storable area is present in the first storage device, the storable area being a combination of a plurality of empty areas having contiguous physical addresses with a total data volume larger than that of a volume of the data; first storing including storing the data in the storable area; and second storing including storing the data that has been stored at the first storing in the storable area as a lump into the second storage device.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the data recording apparatus and the data recording program according to present invention are described below with reference to the accompanying drawings.

Figure 1:
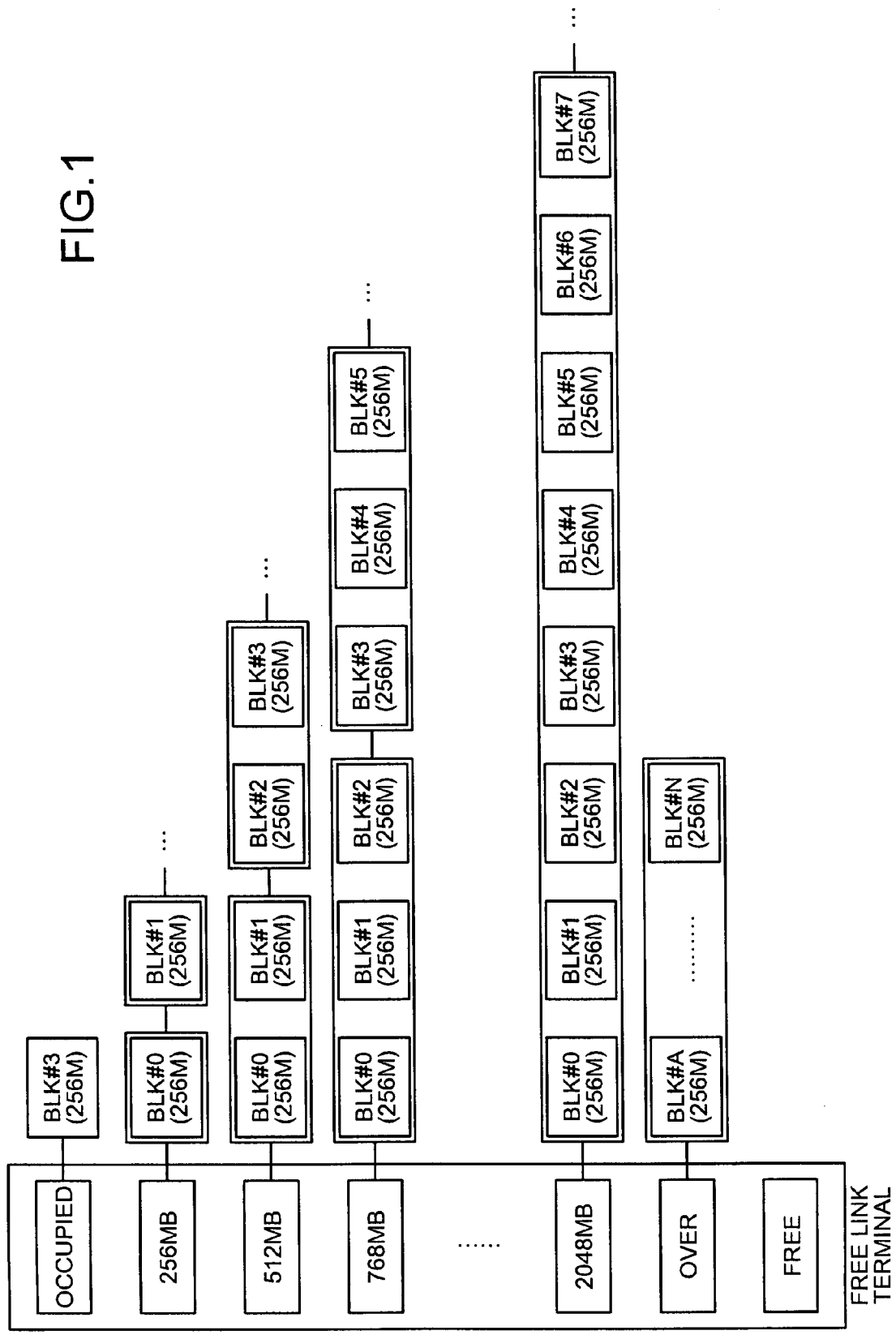
FIG. 1 is a schematic for explaining a data recording apparatus according to an embodiment of the present invention.

An overview and salient feature of a data recording apparatus according to an embodiment of the present invention is described below with reference to FIG. 1. The data recording apparatus has predefined storage areas for storing different data volumes (for example, 256 MB, 512 MB, 768 MB, and so on) in a primary storage (magnetic disk device, and the like). Each storage area is a combination of areas (blocks) of 256 MB having contiguous physical addresses. For example, a 768 MB storage area is created by combining three blocks of 256 MB having contiguous physical addresses. Specifically, if a start address (physical address) of BLK #0 is taken as 0, the start address of BLK #1 would be 0+256 MB, and the start address of BLK #2 would be 0+256 MB+256 MB, and the storage area 768 MB is created by BLK #0 to 2 (the storage area for each data volume will hereinafter be called migration/recall block (MRB)).

When recording user data in the primary storage, the data recording apparatus detects the MRB that can accommodate the user data, and records the user data in the detected MRB. Further, when taking a backup of the user data recorded from the primary storage to a secondary storage (tape device, and the like), the data recording apparatus takes the backup MRB by MRB.

Thus, unlike the conventional technology where user data is recorded in a plurality of MRBs, the data recording apparatus according to the embodiment, detects a single MRB that can accommodate the user data when recording the user data in the primary storage, and takes a backup of the user data recorded in the primary storage to the secondary storage MRB by MRB.

Figure 2:
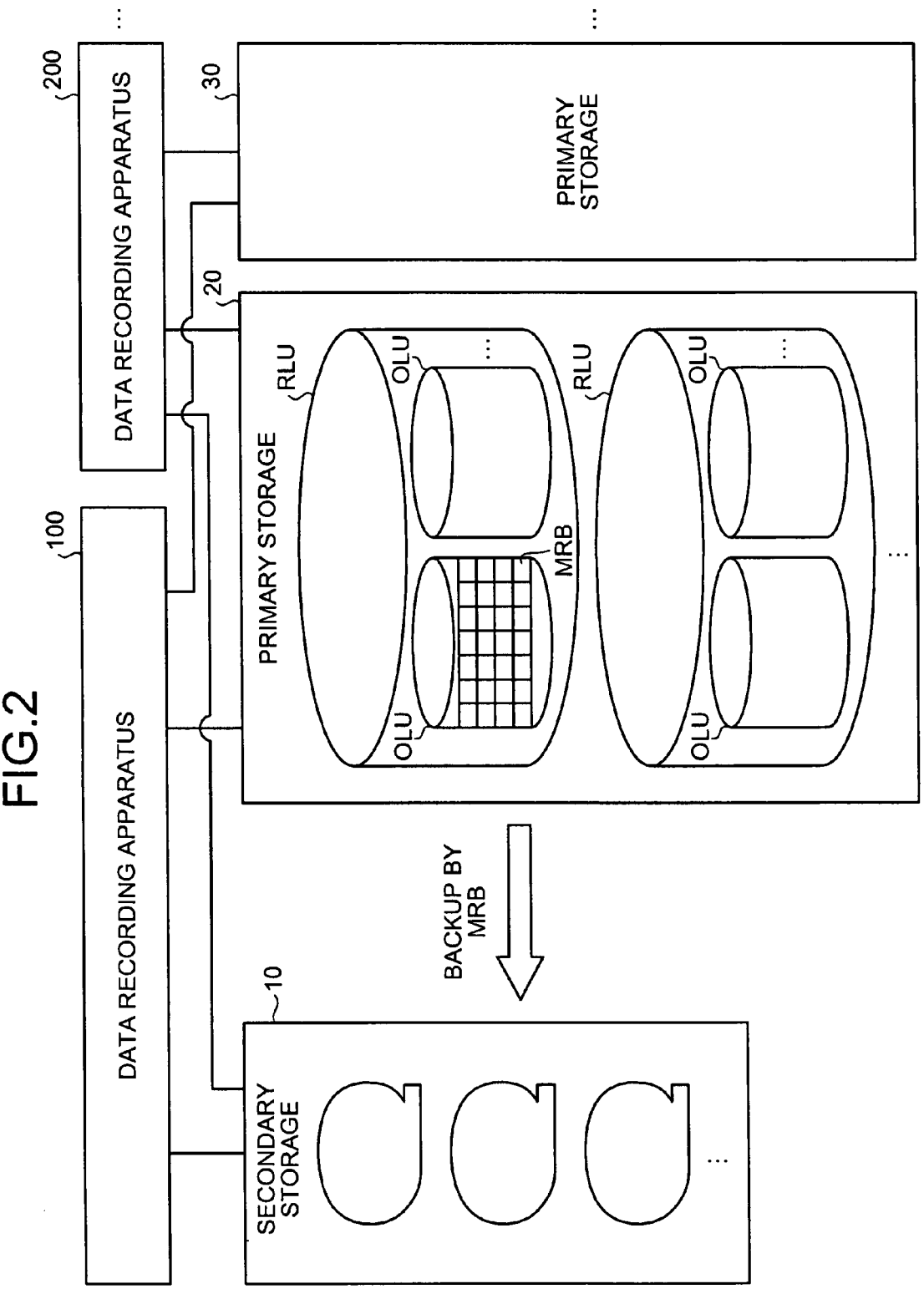
FIG. 2 is a block diagram of a storage system according to the embodiment.

A configuration of a storage system including the data recording apparatus according to the embodiment is described below. FIG. 2 is a block diagram of a storage system according to the embodiment. The storage system includes data recording apparatuses 100 and 200. Each of the recording apparatuses 100 and 200 is connected to primary storages 20 and 30 and a secondary storage 10. Though, in the embodiment, the storage system is configured to include only the data recording apparatuses 100, 200, the primary storages 20 and 30, and the secondary storage 10 for the sake of convenience, the storage system may be configured to include more data recording apparatus, primary storages, secondary storages, and other devices.

The secondary storage 10 is a recording device (for example, a tape device) used to take a backup of the user data recorded in the primary storages 20 and 30. The primary storages 20 and 30 are redundant array of inexpensive disks (RAID) and are recording devices (for example, magnetic disk devices) in which the user data from a not shown host computer is recorded.

The primary storages 20 and 30 each has RAID logical units (RLU) and the data recording apparatuses 100 and 200 control RLU. The RLU is further logically subdivided into open logical units (OLU). Each OLU has an MRB in which user data is stored.

When the user data is retrieved from the not shown host computer, the data recording apparatus 100, detects from the primary storage (of the local system) 20 or the primary storage (of a remote system) 30) the MRB that can accommodate the user data, and stores the user data in the detected MRB. The data recording apparatus 100 periodically records (takes a backup of) the user data recorded in the primary storages 20 and 30 to the secondary storage 10 (the data recording apparatus 200 is functionally identical to the data recording apparatus 100 and hence is not described in detail).

Figure 3:
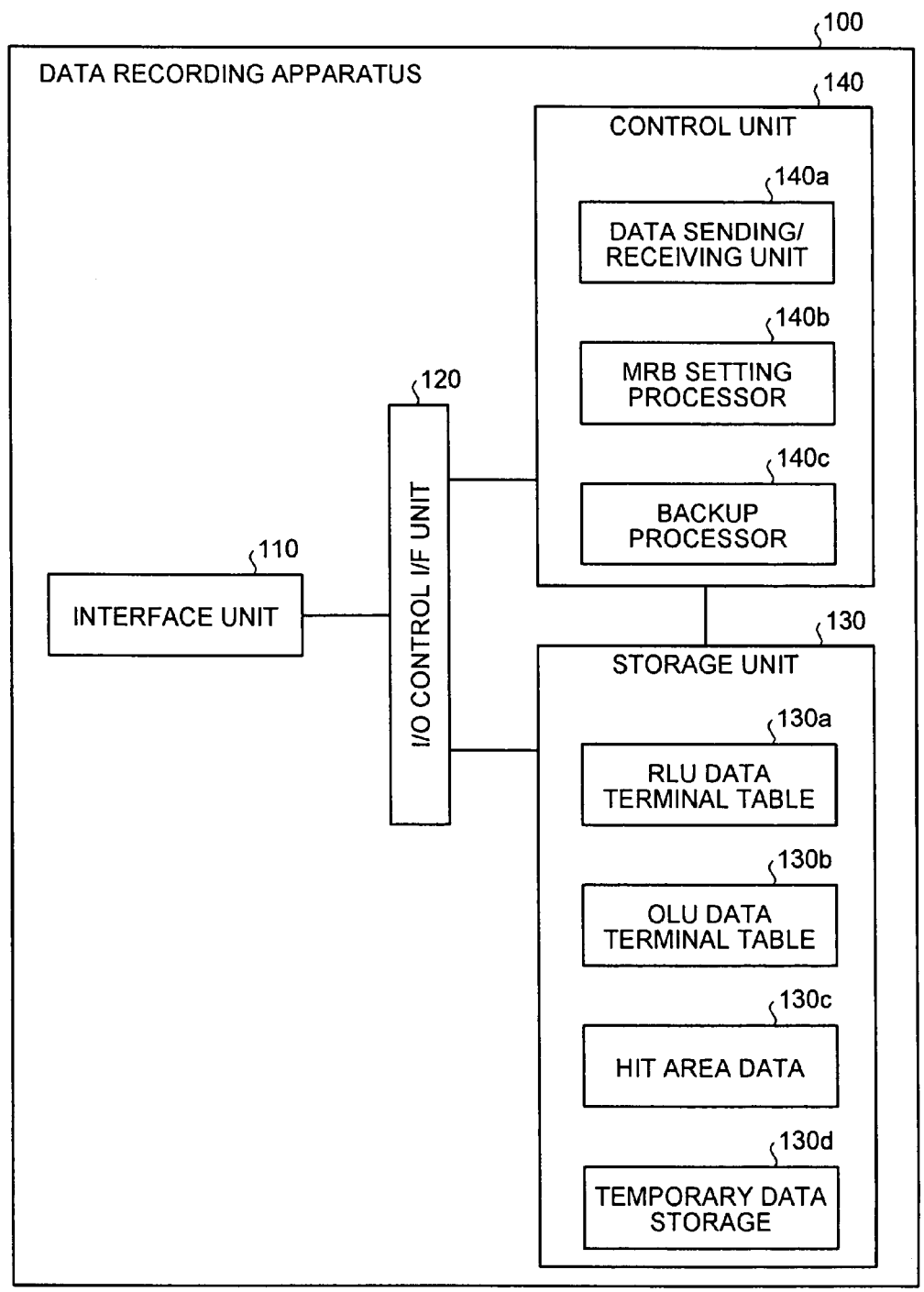
FIG. 3 is a diagram of the data recording apparatus shown in FIG. 2.

A configuration of the data recording apparatus 100 shown in FIG. 2 is described below (the data recording apparatus 200 is structurally identical to the data recording apparatus 100 and hence is not described in detail). FIG. 3 is a diagram of the data recording apparatus 100 shown in FIG. 2. The data recording apparatus 100 includes an interface unit 110, an input/output (I/O) control interface (I/F) unit 120, a storage unit 130, and a control unit 140.

The interface unit 110 controls data exchange of data between the data recording apparatus 100 and the not shown host computer, the primary storages 20 and 30, the secondary storage 10, and the data recording apparatus 200. The I/O control I/F unit 120 controls the input and output of data between the interface unit 110, the storage unit 130, and the control unit 140.

The storage unit 130 stores data and programs required for various processes performed by the control unit 140. The storage unit 130 includes, as shown in FIG. 3, an RLU data terminal table 130a, an OLU data terminal table 130b, hit area data 130c, temporary data storage 130d.

The RLU data terminal table 130a is a table for managing the OLU present in each RLU. In other words, the RLU data terminal table 130a contains data for managing the OLU data terminal table 130b and has stored therein the OLU and the OLU data terminal table 130b in an associated form. There is one RLU data terminal table 130a for every RLU controlled by the primary storages 20 and 30.

The OLU data terminal table 130b contains data for managing the MRB set in the OLU. Specifically, the OLU data terminal table 130b contains data related to head/tail of free lists corresponding to each data volume (256 MB, 512 MB, 768 MB, 2048 MB, etc.), data for managing each free group of the data volumes by link lists, and head/tail data of each link list.

Figure 4:
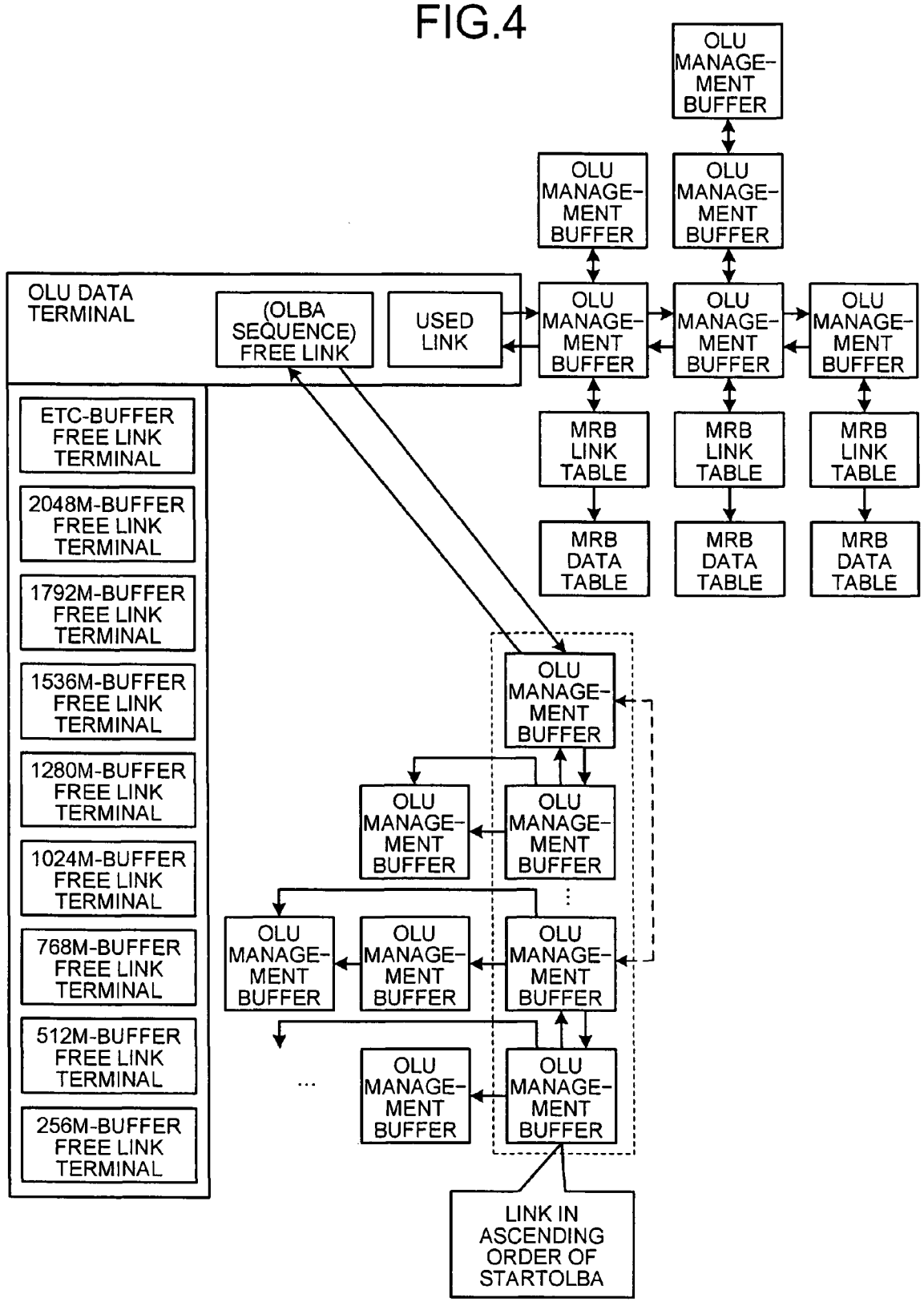
FIG. 4 is a schematic for explaining an OLU data terminal table shown in FIG. 3.

FIG. 4 is a schematic for explaining an OLU data terminal table 130b shown in FIG. 3. The OLU data terminal table 130b contains the free lists corresponding to each data volume are linked to each other by OLU management buffers and each OLU management buffer is linked to an MRB link table and an MRB data table. The MRB link table associates the OLU management buffer and the MRB data table. The MRB data table contains OLU numbers corresponding to the OLU management buffers, the physical addresses (StartOLBA) of the MRB in the primary storages 20 and 30, etc.

The OLU management buffers corresponding to the MRBs to which user data is recorded are linked to a used link. The OLU management buffers corresponding to the MRB in which user data is not recorded are linked to the free link in the ascending order of the StartOLBA. A combination of the OLU management buffers, the MRB link table, and the MRB data table is equivalent to one block shown in FIG. 1. Each block is managed is linked to each data volume and is managed accordingly. (However, the actual MRB storage area is in the primary storages 20 and 30).

The hit area data 130c is data for every MRB indicating whether a backup of the user data stored in the MRBs of the primary storages 20 and 30 has been taken on the secondary storage 10. The temporary data storage 130d is a temporarily recorded user data recorded in the primary storages 20 and 30.

The control unit 140 has an internal memory for storing programs stipulating process procedures and control data and executes various processes by the programs and the control data. The control unit 140 includes, as shown in FIG. 3, a data sending/receiving unit 140a, an MRB setting processor 140b, and a backup processor 140c.

When the user data is retrieved from the not shown host computer, the data sending/receiving unit 140a records the user data in the MRB of the primary storages 20 and 30 set by the MRB setting processor 140b. Upon receiving a data request from the host computer, the data sending/receiving unit 140a selects the corresponding user data from the primary storages 20 and 30 and outputs the selected user data to the host computer.

When the data sending/receiving unit 140a retrieves the user data, the MRB setting processor 140b detects the MRB that can accommodate the user data based on the OLU data terminal table 130b. Specifically, the MRB setting processor 140b refers to all the blocks linked to the free link (see FIG. 4) of the OLU data terminal table 130b, compares the data volume of the terminal associated with each block and the data volume of the user data to be recorded, and selects the group of blocks in excess of the data volume of the user data. The MRB setting processor 140b then notifies the MRB data table of each block group to the data sending/receiving unit 140a. The data sending/receiving unit 140a then records the user data in the primary storages 20 and 30 based on the StartOLBA included in the MRB data table.

Figure 5:
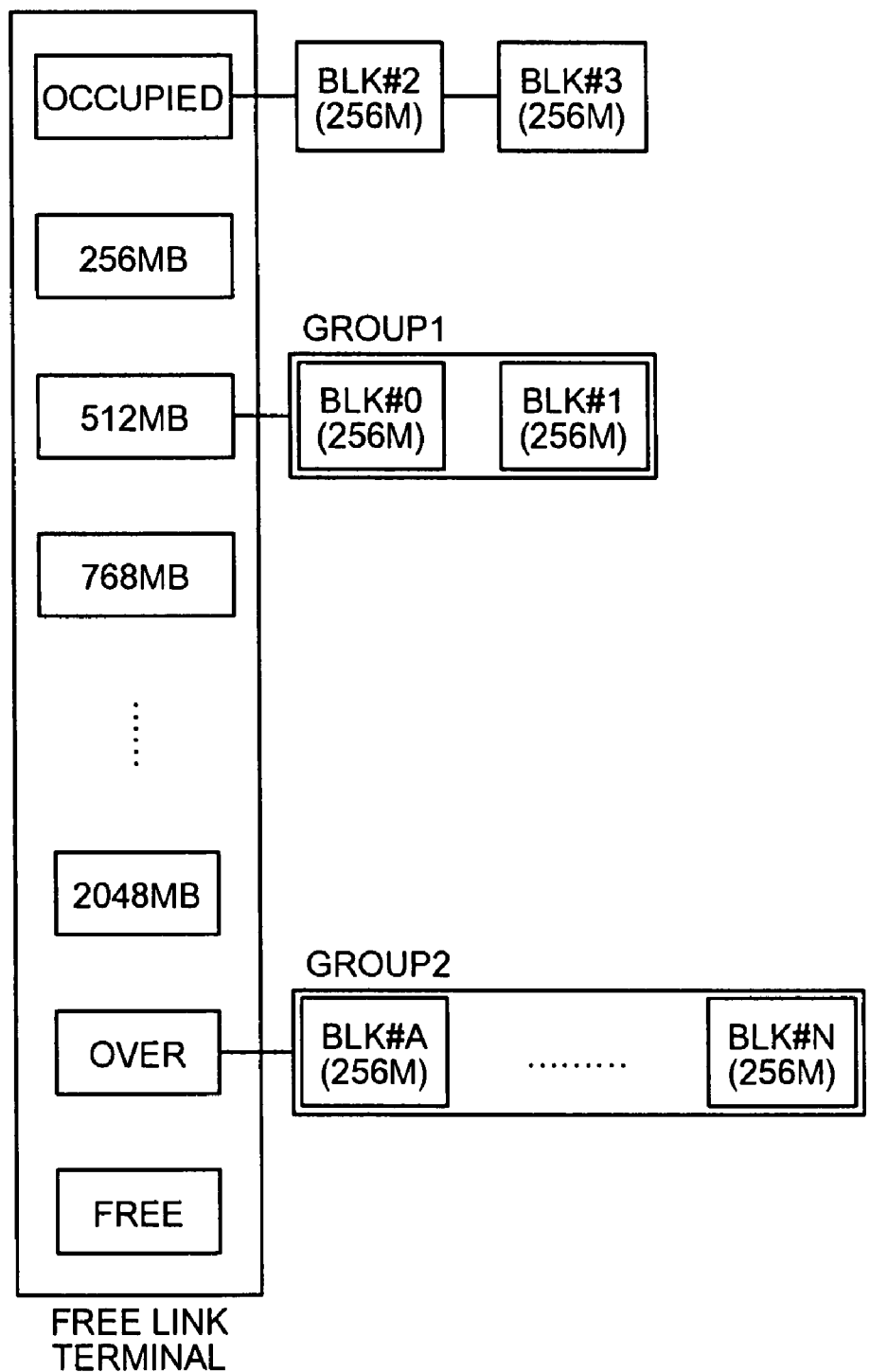
FIG. 5 is a schematic for explaining how an MRB setting processor detects free areas shown in FIG. 3.

FIG. 5 is a schematic for explaining how the MRB setting processor 140b detects a free area. Upon detecting the MRB, the MRB setting processor 140b detects the MRB to which user data will be recorded by checking the MRBs stating from the MRB corresponding to the terminal that has the least data volume. For example, if the data volume of the user data is 200 MB, the MRB setting processor 140b starts from the 256 MB MRB, and if no free space is available in the 256 MB MRB, proceeds to check if free space is available in the 512 MB MRB.

As only one of the blocks forming the 512 MB MRB will be used for recording the user data, the MRB setting processor 140b links the unused block of 256 MB to the 256 MB terminal. That is, the MRB setting processor 140b links the remaining MRB to the terminal with the same data volume as the remaining MRB. The MRB setting processor 140b continues the process till OVER is reached (OVER is a terminal to which MRB having a data volume above the 2048 MB are linked).

If no free space is found, the MRB setting processor 140b checks whether a contiguous area (MRB) can be secured by combining free areas and hit areas (containing data that are already written to the tape and can be deleted). If a contiguous area can be secured by combining free areas and hit areas, the MRB setting processor 140b deletes the data recorded in the hit area and allocates the user data to the freed area.

Figure 6:
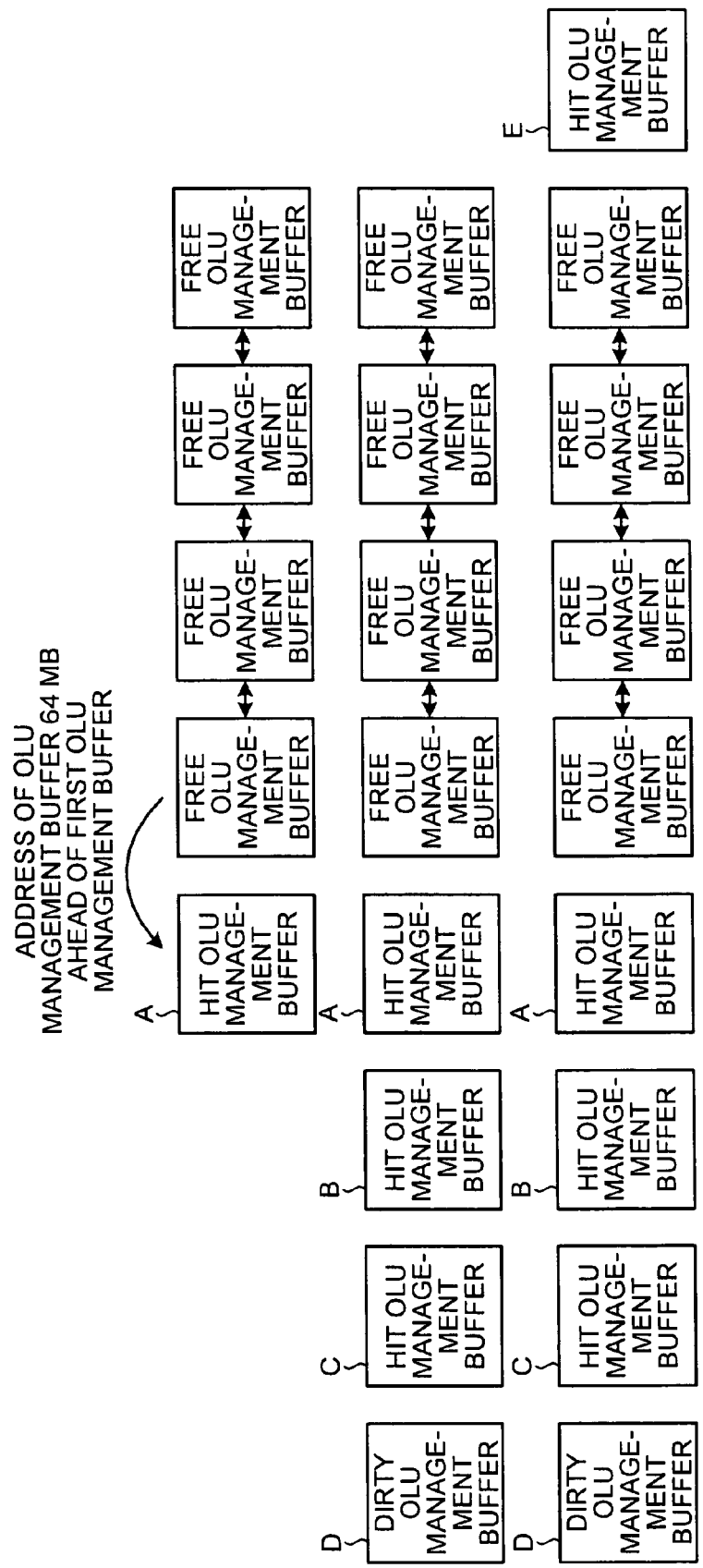
FIG. 6 is a schematic for explaining how the MRB setting processor allocates user data to an area obtained by combining free areas and hit areas shown in FIG. 3.
Figure 7:
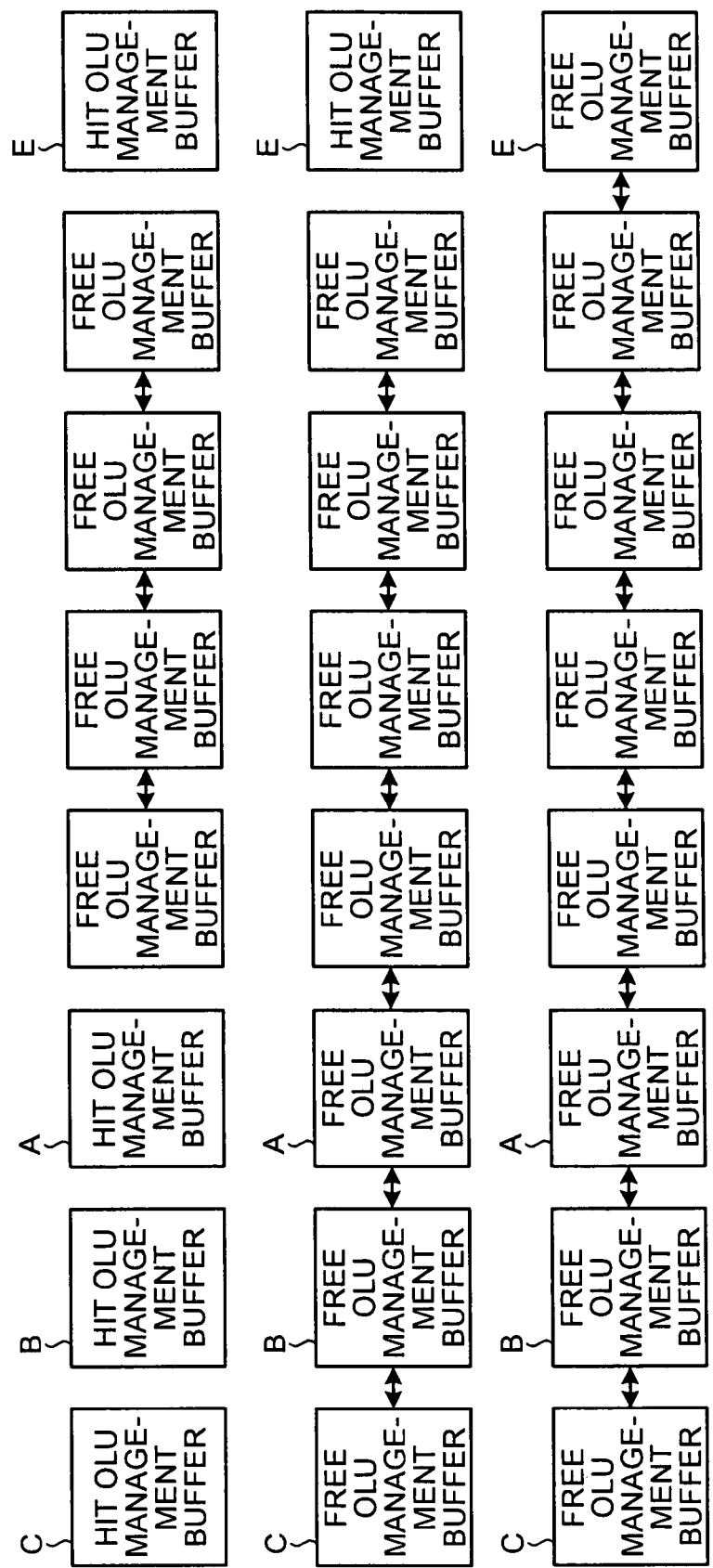
FIG. 7 is a schematic for explaining how the MRB setting processor allocates the user data to an area obtained by combining free areas and hit areas in FIG. 3.

FIG. 6 and FIG. 7 are schematics for explaining a process of allocating the user data to an area obtained by combining free areas and hit areas. For the sake of convenience, it is assumed that a 2048 MB user data is to be allocated and that a free group (free area) of 1024 MB is available.

As shown in the first row in FIG. 6, the MRB setting processor 140b refers to the OLU data terminal table 130b, and taking the first OLU management buffer (parent buffer) in the OLU management buffer group as the reference, seeks the address of the OLU management buffer of 256 MB immediately before the first OLU management buffer (denoted by A in FIG. 6) that contains the StartOLBA (the address determined will be the address corresponding to the OLU management buffer 64 MB before the reference OLU management buffer). The MRB setting processor 140b then checks, based on the hit area data 130c, whether the data written in the MRB allocated to the OLU management buffer A can be deleted. If the data can be deleted, the MRB setting processor 140b deletes the data recorded in the hit area and frees the area (this process is described later).

As shown in the second row in FIG. 6, after finding the OLU management buffer A, the MRB setting processor 140b proceeds to determine the address of the OLU management buffer (denoted by B in FIG. 6) of 256 MB immediately before the OLU management buffer A that contains the StartOLBA, and checks whether it is possible to delete the data written in the MRB to which the OLU management buffer B is allocated. This process of determining the address of the OLU management buffer containing the StartOLBA in the forward direction and deleting the data from the MRB to which the OLU management buffer is allocated is continued as many times as is required to find the free space required to accommodate the user data. In the present case, the MRB setting processor 140b will end the process upon finding four OLU management buffers that can be freed. However, the MRB setting processor 140b will end the checking process in the forward direction as soon as it comes across an OLU management buffer that cannot be freed before finding the four OLU management buffers that can be freed.

As shown in the third row in FIG. 6, the MRB setting processor 140b proceeds to conduct the checking process in the backward direction, as it comes across an OLU management buffer that cannot be freed in the forward direction. To perform the checking process in the backward direction, the MRB setting processor 140b, taking the last OLU management buffer of the OLU management buffer group as the reference, seeks the address of the OLU management buffer 256 MB after the last OLU management buffer that contains the StartOLBA (denoted by E in FIG. 6). The MRB setting processor 140b then refers to the hit area data 130c to check whether the OLU management buffer E can be converted to a free area. If the OLU management buffer E can be freed, having found the fourth OLU management buffer E that can be freed, the MRB setting processor 140b ends the checking process. If the OLU management buffer E cannot be freed, the MRB setting processor 140b proceeds with the checking process of another OLU management buffer group in a similar fashion.

As shown in the first show in FIG. 7, after finding the OLU management buffer group to which the user data can be allocated, the MRB setting processor 140b proceeds to free the OLU management buffers in the order in which they were found. The data in the MRB linked to the OLU management buffer A is deleted to free the OLU management buffer A. Similarly, the OLU management buffers B and C are freed by deleting the data in the MRB linked to these buffers.

As shown in the second row in FIG. 7, after freeing the OLU management buffer C, the MRB setting processor 140b frees the MRB linked to the OLU management buffer E. Thus, as shown in the third row in FIG. 7, the MRB setting processor 140b creates a free space of 2048 MB and allocates the user data to the freed 2048 MB space.

In the example described above, data area is secured by combining free areas and hit areas. Data area can also be secured by combining only hit areas having data that can be deleted, and user data can be recorded in the secured area.

If an MRB that can accommodate the user data cannot be secured either by combining free areas and hit areas or by combining only the hit areas, the MRB setting processor 140b notifies the fact to the data sending/receiving unit 140a, which temporarily stores the user data in the temporary data storage 130d until free space is secured.

The backup processor 140c manages the user data recorded in the primary storages 20 and 30 MRB by MRB, and records (takes a backup of) in the secondary storage 10 those user data that were recorded in the MRBs a predetermined length of time ago.

Figure 8:
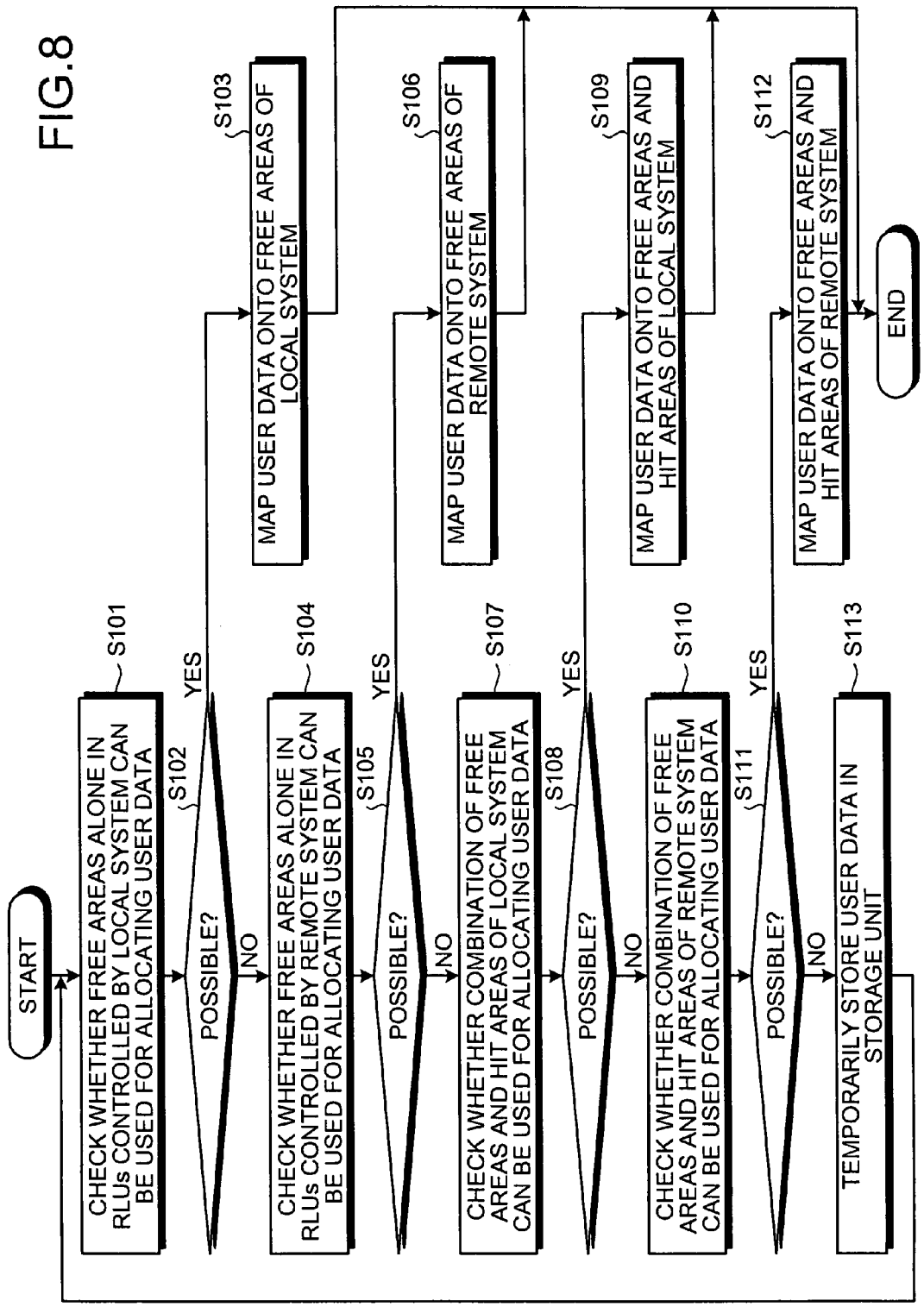
FIG. 8 is a flowchart of a data recording process according to the embodiment.

A process of the data recording apparatus 100 is described below. FIG. 8 is a flowchart of a data recording process according to the embodiment. The data recording apparatus 100 refers to the RLU data terminal table 130a and the OLU data terminal table 130b, and checks whether the free areas alone in the RLUs controlled by the local system (all the RLUs in the primary storage 20) can be used for allocating the user data (that is, whether an MRB with a data volume greater than that of the user data can be secured) (step S101).

If the free areas alone in the local system can be used for allocating the user data (Yes at step S102), the data recording apparatus 100 maps the user data onto the available free areas in the local primary storage (the primary storage 20) (step S103).

If the free areas alone in the local system are not sufficient for allocating the user data (No at step S102), the data recording apparatus 100 checks whether the free areas alone in the RLUs controlled by the remote system (all the RLUs of the primary storage 30) can be used for allocating the user data (step S104).

If the free areas alone in the remote system can be used for allocating the user data (Yes at step S105), the data recording apparatus 100 maps the user data onto the available free areas in the remote primary storage (the primary storage 30) (step S106).

If the free areas alone in the remote system are not sufficient to allocate the user data (No at step S105), the data recording apparatus 100 checks whether combining free areas and hit areas (that is, obtaining an area by combining free areas and hit areas) in the RLUs of the local system can be used for allocating the user data (step S107).

If the area obtained by combining the free areas and the hit areas in the local system can be used for allocating the user data (Yes at step S108), the data recording apparatus 100 maps the user data onto the combination of free areas and hit areas of the local system (step S109).

If the area obtained by combining the free areas and the hit areas is not enough for allocating the user data (No at step S108), the data recording apparatus 100 checks whether a combination of free areas and hit areas in the RLUs of the remote system can be used for allocating the user data (step S110).

If a combination of free areas and hit areas in the remote system can be used for allocating the user data (Yes at step S111), the data recording apparatus maps the user data onto the free areas and hit areas of the remote primary storage 30 (step S112).

If the area obtained by combining the free areas and the hits areas in the remote system is not sufficient for allocating the user data (No at step S111), the data recording apparatus 100 temporarily stores the user data in the temporary data storage 130d (step S113), and performs step S101 after a specific time period has elapsed.

Thus, when the user data is retrieved, the data recording apparatus 100 detects the MRB that can accommodate the retrieved user data and records the user data in the detected MRB. As a result, a backup of the data recorded in the primary storages 20 and 30 can be efficiently taken on the secondary storage 10.

Figure 9:
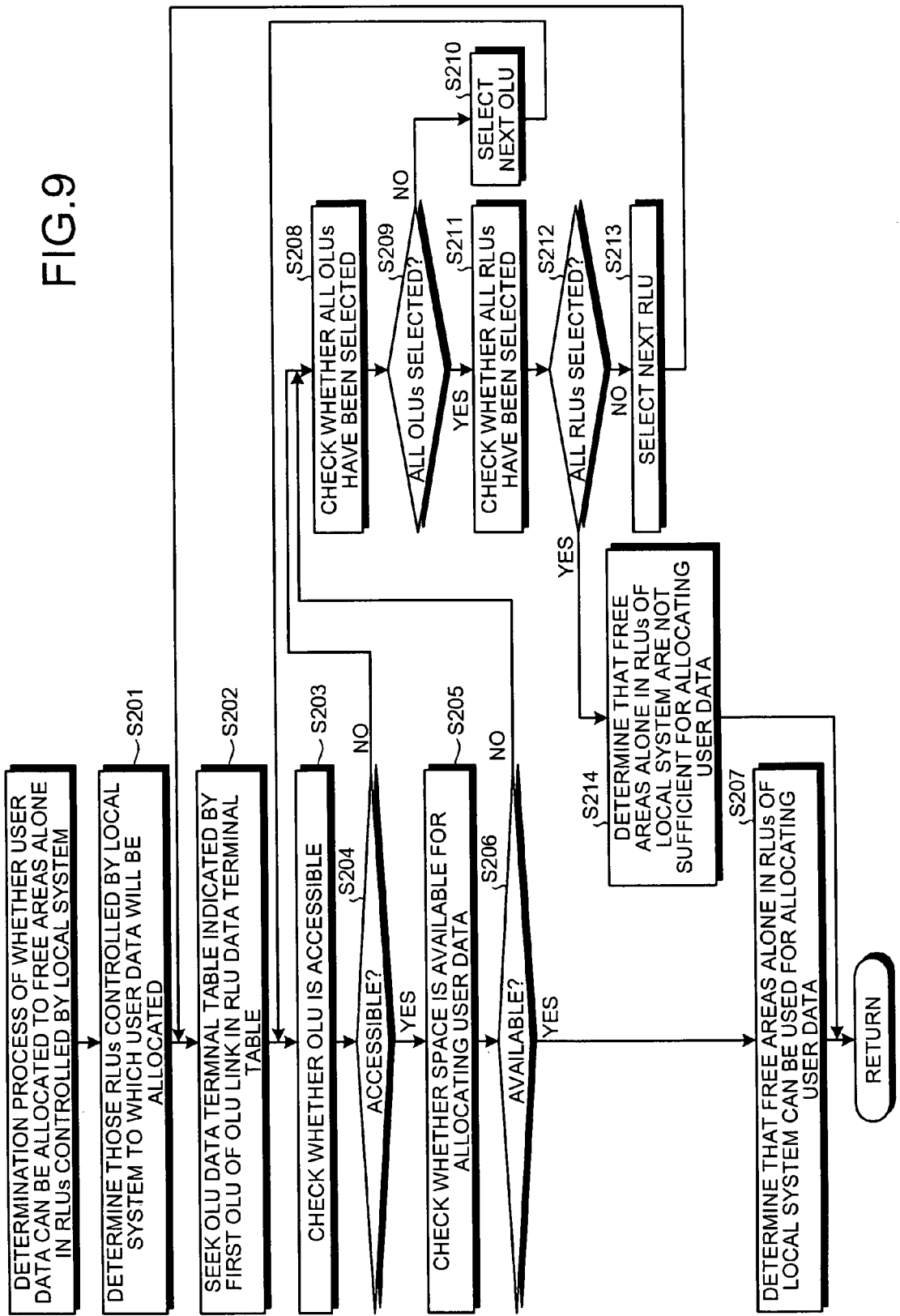
FIG. 9 is a flowchart of a process for determining free area at step S101 shown in FIG. 8.

The determination process performed at step S101 of FIG. 8 is described below in detail. FIG. 9 is a flowchart of a process for determining free area at step S101 shown in FIG. 8. The data recording apparatus 100 refers to the RLU data terminal table 130a, determines those RLUs controlled by the local system to which the user data will be allocated (step S201), and seeks the OLU data terminal table 130b indicated by the OLU at the head of the OLU link in the RLU data terminal table 130a (step S202).

The data recording apparatus 100 checks whether the OLU is accessible (step S203), and if the OLU is accessible (Yes at step S204), checks whether space is available in the OLU for allocating the user data (step S205). If space is available (Yes at step S206), the data recording apparatus 100 determines that the user data can be allocated to the free areas alone in the RLUs of the local system (step S207) and ends the process.

If the OLU is not accessible (No at step S204), or if free space is not available for allocating the user data (No at step S206), the data recording apparatus 100 checks whether all the OLUs have been selected (step S208), and if not (No at step S209), selects the next OLU (step S210), and returns to step S203.

If all the OLUs have been selected (Yes at step S209), the data recording apparatus checks whether all the RLUs of the local system have been selected (step S211), and if not (No at step S212), selects the next RLU (step S213), and returns to step S202.

If all the RLUs have been selected (Yes at step S212), the data recording apparatus 100 determines that the user data can be allocated to the free areas alone in the RLUs of the local system (step S214), and ends the process.

A detailed description of the process at step S104 of FIG. 8 is done away with as it is substantially similar to the process explained with reference to FIG. 9, except that local system is substituted with remote system.

Figure 10:
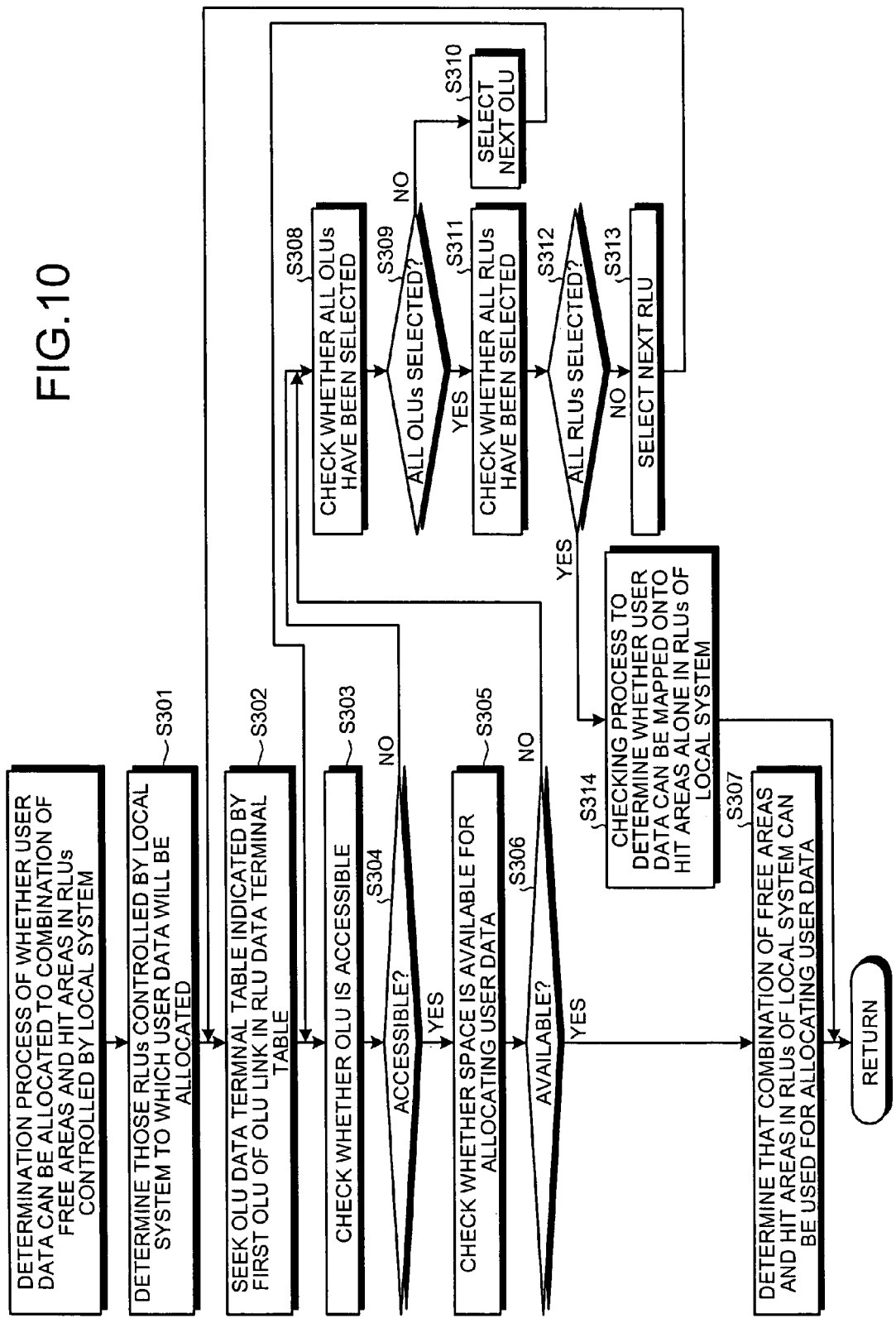
FIG. 10 is a flowchart of a process for determining combination of free area and hit area at step S107 shown in FIG. 8.

The determination process performed at step S107 of FIG. 8 is described below in detail. FIG. 10 is a flowchart of a process for determining combination of free area and hi area at step S107 shown in FIG. 8. The data recording apparatus 100 selects those RLUs from the RLUs of the local system to which the user data will be allocated (step S301), and seeks the OLU data terminal table 130b indicated by the first OLU in the OLU link in the RLU data terminal table 130a (step S302).

The data recording apparatus then checks whether the OLU is accessible (step S303), and if accessible (Yes at step S304), checks whether space (including the hit areas) for allocating the user data is available (step S305), and if available (Yes at step S306), determines that the free areas and hit areas in the RLUs in the local system can be used for allocating the user data (step S307), ending the process.

If the OLU is not accessible (No at step S304), or if no space is available for allocating the user data (No at step S306), the data recording apparatus 100 checks whether all the OLUs have been selected (step S308).

If all the OLUs have not been selected (No at step S309), the data recording apparatus 100 selects the next OLU (step S310 and returns to step S303. If all the OLUs have been selected (Yes at step S309), the data recording apparatus 100 checks if all the RLUs have been selected (step S311).

If all the RLUs have not been selected (No at step S312), the data recording apparatus 100 selects the next RLU (step S313), and returns to step S302). If all the RLUs have been selected (Yes at step S312), the data performs a checking process to determine whether the user data can be mapped onto the hit areas alone in the RLUs of the local system (step S314), and ends the process.

Figure 11:
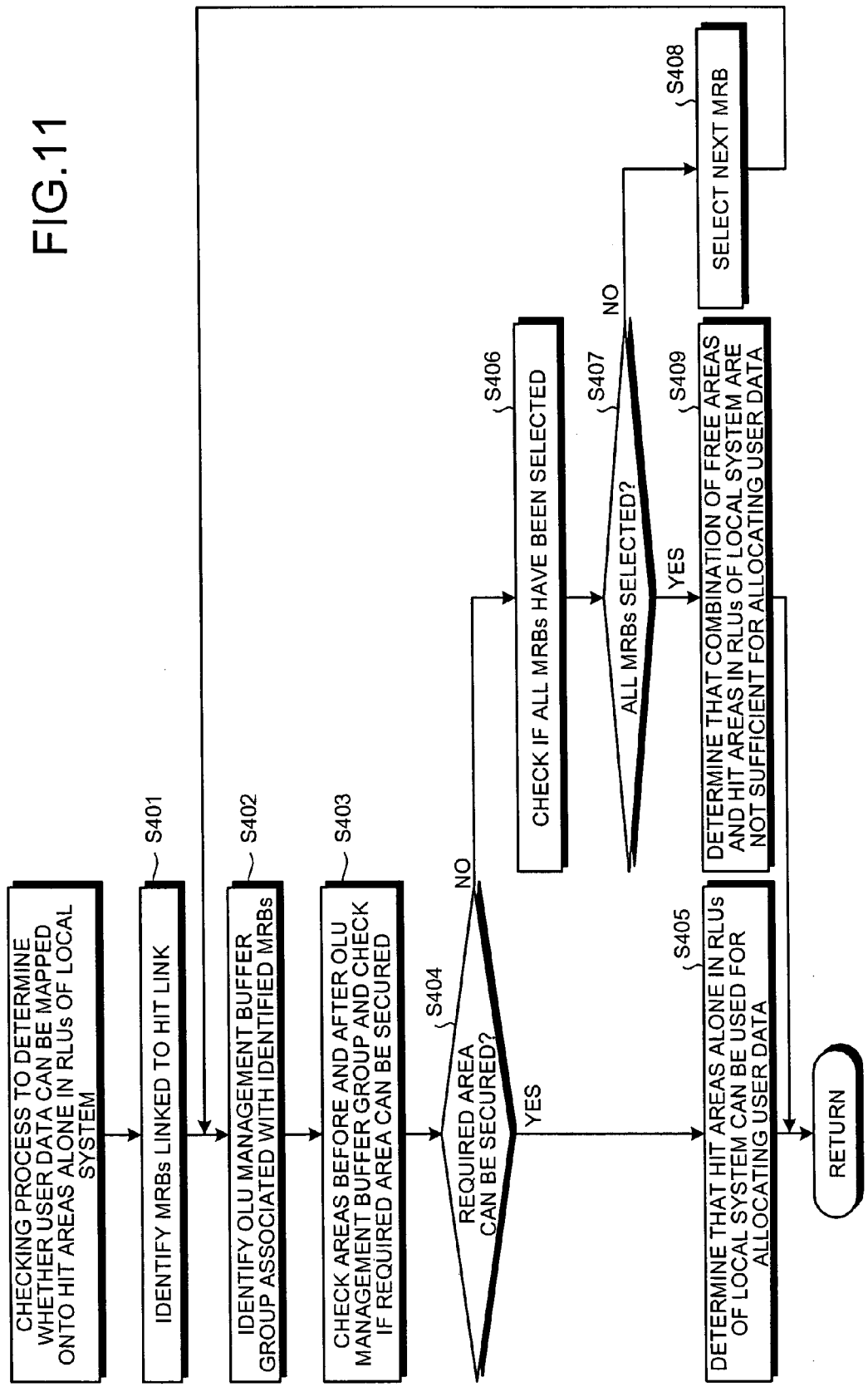
FIG. 11 is a flowchart of a process for checking the determination at step S314 shown in FIG. 10.

The checking process performed at step S314 of FIG. 10 is described below in detail. FIG. 11 is a flowchart of a process for checking the determination at step S314 shown in FIG. 10. The data recording apparatus 100 identifies the MRBs (OLU management buffers) linked to the hit link (used link) (step S401), and identifies the OLU management buffer group associated with the identified MRBs (step S402).

The data recording apparatus 100 then checks the areas before and after the OLU management buffer group to determine whether the required area can be secured (step S403). If the required area can be secured (Yes at step S404), the data recording apparatus 100 determines that the user data can be mapped onto the hit areas alone in the RLUs of the local system (step S405), and ends the process.

If the required area cannot be secured (No at step S404), the data recording apparatus 100 checks whether all the MRBs of the hit areas have been selected (step S406), and if not (No at step S407), selects the next MRB (step S408), and returns to step S402).

If all the MRBs have been selected (Yes at step S407), the data recording apparatus determines that the free areas and hit areas are not sufficient for allocating the user data (step S409), and ends the process.

A detailed description of the process at step S110 of FIG. 8 is done away with as it is substantially similar to the process explained with reference to FIG. 10, except that local system is substituted with remote system.

Thus, the data recording apparatus 100 uses both the free areas and the hit areas to secure the MRB, and records the user data in the secured MRB. As a result, the user data can be recorded in the primary storages 20 and 30 without any lag.

Thus, in the data recording apparatus according to the embodiment, when the data sending/receiving unit 140a retrieves the user data from the host computer, the MRB setting processor 140b refers to the RLU data terminal table 130a and OLU data terminal table 130b, detects the MRB in the primary storages 20 and 30 that can accommodate the user data, and records the user data in the detected MRB. The backup processor 140c records the user data that are no longer in use from the primary storages 20 and 30 to the secondary storage 10 MRB by MRB. Consequently, backup can be taken efficiently for user data of various sizes, improving the performance of the storage system.

A computer program can be executed on a computer system to realize the same functions as the data recording apparatus.

Figure 12:
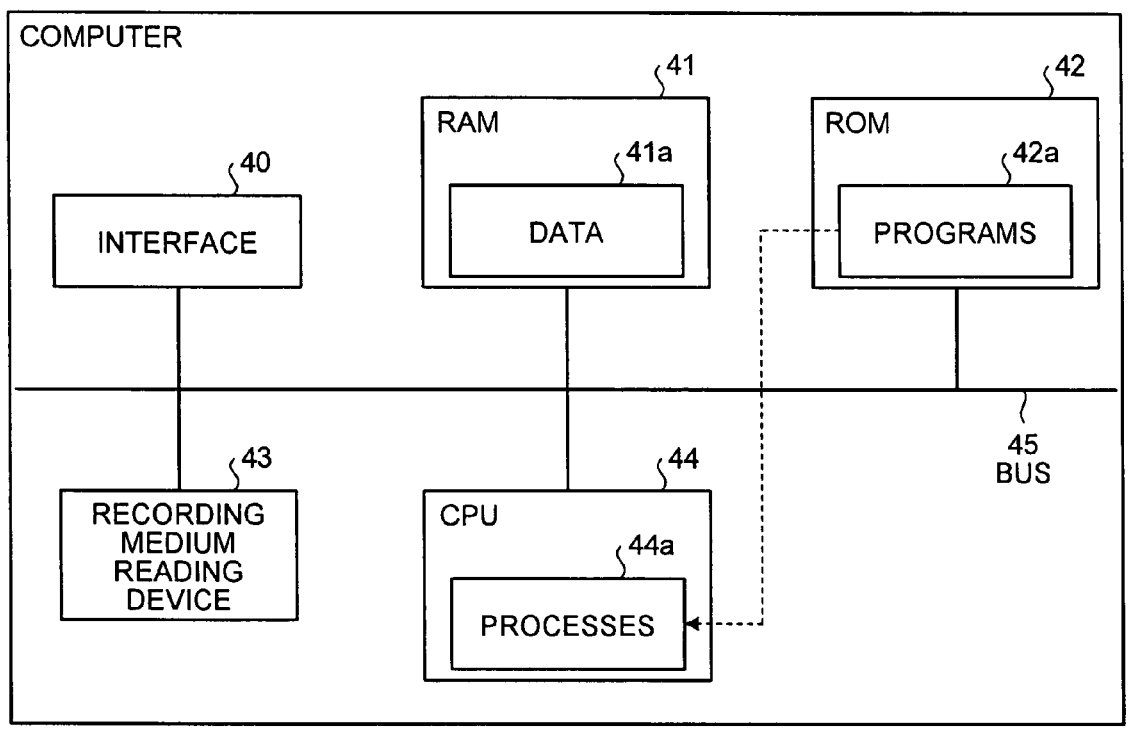
FIG. 12 is a block diagram of hardware configuration of the data recording apparatus shown in FIG. 2.

FIG. 12 is a block diagram of hardware configuration of the data recording apparatus shown in FIG. 2. The computer includes an interface 40 through which data is exchanged with another computer, a random access memory (RAM) 41, a read-only memory (ROM) 42, a recording medium reading device 43 that reads programs from a recording medium, a central processing unit (CPU) 44, all of which are interconnected by a bus 45.

The ROM 42 has stored therein various programs 42a that demonstrate functions similar to those of the data recording apparatus 100. The CPU 44 reads the programs 42a from the ROM 42 to implement various processes 44a of the functional units of the data recording apparatus 100.

The RAM 41 stores therein various data 41a corresponding to the data stored in the storage unit 130 of the data recording apparatus 100. The CPU 44 retrieves the data from the host computer and stores them in the RAM 41, and based on the data 41a stored in the RAM 41, processes the data.

The programs 42a need not necessarily be kept in the ROM 42, and can be stored in a portable physical medium such as flexible disks (FD), compact disk-read-only memory (CD-ROM), digital versatile disks (DVD), and integrated circuit (IC) cards or in a fixed medium such as external hard disk drive (HDD), or on a different computer (or a server) connected to the computer via a public line, Internet, local area network (LAN) or wide area network (WAN). The computer executes the programs 42a by readings them from the recording medium.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

All the automatic processes explained in the present embodiment can be, entirely or in part, carried out manually. Similarly, all the manual processes explained in the present embodiment can be entirely or in part carried out automatically by a known method.

The process procedures, the control procedures, specific names, and data, including various parameters mentioned in the description and drawings can be changed as required unless otherwise specified.

The constituent elements of the apparatus illustrated are merely conceptual and may not necessarily physically resemble the structures shown in the drawings. For instance, the apparatus need not necessarily have the structure that is illustrated. The apparatus as a whole or in parts can be broken down or integrated either functionally or physically in accordance with the load or how the device is to be used.

The process functions performed by the apparatus are entirely or partially realized by the CPU or a program executed by the CPU or by a hardware using wired logic.

According to an aspect of the present invention, when data to be recorded in a first recording device is retrieved, the data recording apparatus detects in the first recording device a storage area formed of areas having contiguous physical addresses and having a storage volume greater than a volume of the data, records the data in the detected storage area, and records data-wise the data recorded in the first recording device to a second recording device. Consequently, a backup of the data in the first recording device can be taken efficiently, improving the performance of a storage system that includes the first recording device and the second recording device.

According to another aspect of the present invention, the storage areas are managed according to predetermined storage volumes, and when the data to be recorded in the first storage device is retrieved, the data storing apparatus selects the storage area that can accommodate the data and stores the data in the selected storage area. Consequently, data can be recorded efficiently in the first storage device.

According to still another aspect of the present invention, the data recording apparatus selects the storage area in an ascending order of the storage volume, starting from the storage area with the least volume from among the plurality of storage areas categorized according to predetermined volumes, and stores the data in the selected storage area. Consequently, the resources of the first recording device can be efficiently utilized.

According to still another aspect of the present invention, when the storage area in the first recording device is less than the volume of the data to be recorded in the first recording device, the data recording apparatus detects from among the storage areas in the first recording device hit storage areas containing therein data that are recorded to the second recording device, and secures a combined area by combining the detected hit storage areas and the storage area formed of areas having contiguous addresses and records the data in the combined area. Consequently, data can be recorded in the first recording device without any lag.

According to still another aspect of the present invention, if a total storage volume secured by combining the hit storage areas and the storage area formed by areas having contiguous addresses is less than the volume of the data to be recorded in the first recording device, the data recording apparatus temporarily stores the data to be recorded in the first recording device until the total storage volume secured is greater than the volume of the data. Consequently, data can be recorded efficiently in the first storage device.

According to still another aspect of the present invention, when the storage area is less than the volume of the data to be recorded in the first recording device, the data recording apparatus detects from among the storage areas in the first recording device the hit storage areas containing therein the data that are recorded to the second recording device, and records the data in the hit storage areas having contiguous physical addresses. Consequently, data can be recorded efficiently in the first storage device.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data recording apparatus that stores same data in a first storage device and a second storage device, the first storage device and the second storage device being formed of a plurality of areas each having a data volume, the data recording apparatus comprising:
a determining unit that:
determines whether a storable area is present in the first storage device, the storable area being a combination of a plurality of empty areas having contiguous physical addresses with a total data volume larger than that of a volume of the data, and
determines, when no storable area is present in the first storage device, whether a combined area is present in the first storage device, the combined are being a combination of a plurality of backed-up areas storing therein data that has already been stored in the second storage device or a combination of the empty area and the backed-up area, and the combined area having contiguous physical addresses with a total volume larger than or equal to that of the volume of the data;
a first storage unit that:
stores the data in the storable area, when the determining unit determines that the storable area is present in the first storage device, and
stores the data in the combined area, when the determining unit determines that the combined area is present in the first storage device; and
a second storage unit that: stores the data that has been stored by the first storage unit as a lump into the second storage device.

2. The data recording apparatus according to claim 1, further comprising a holding unit that holds information relating to a physical address and a data volume of each empty area in the first storage device, wherein
the determining unit determines whether the storable area is present in the first storage device based on the information held by the holding unit.

3. The data recording apparatus according to claim 2, wherein if the determining unit determines that a plurality of the storable areas are present in the first storage device, the determining unit selects a storable area having least data volume from among the storable areas.

4. The data recording apparatus according to claim 1, wherein when the determining unit determines that no combined area is present in the first storage device,
the first storage unit temporarily stores the data in a temporary data storage until the determining unit determines any one of the storable area and the combined area.

5. A computer-readable recording medium that stores therein a computer program that causes a computer to implement a method of storing same data in a first storage device and a second storage device, the first storage device and the second storage device being formed of a plurality of areas each having a data volume, the computer program causing the computer to execute:
first determining whether a storable area is present in the first storage device, the storable area being a combination of a plurality of empty areas having contiguous physical addresses with a total data volume larger than that of a volume of the data;
second determining, when it is determined that no storable area is present in the first storage device, whether a combined area is present in the first storage device, the combined area being a combination of a plurality of backed-up areas storing therein data that has already been stored in the second storage device or a combination of the empty area and the backed-up area, and the combined area having contiguous physical addresses with a total volume larger than or equal to that of the volume of the data;
first storing including:
storing the data in the storable area, when the first determining determines that the storable area is present in the first storage device, and
storing the data in the combined area, when the second determining determines that the combined area is present in the first storage device; and
second storing including storing the data that has been stored at the first storing as a lump into the second storage device.

6. The computer-readable recording medium according to claim 5, further comprising acquiring information relating to a physical address and a data volume of each empty area in the first storage device, wherein
the first determining includes determining whether the storable area is present in the first storage device based on the information acquired at the acquiring.

7. The computer-readable recording medium according to claim 5, wherein if it is determined at the first determining that a plurality of the storable areas are present in the first storage device, the first determining includes selecting a storable area having least data volume from among the storable areas.

8. The computer-readable recording medium according to claim 5, wherein when it is determined at the determining that no combined area is present in the first storage device, the first storing includes temporarily storing the data in a temporary data storage until any one of the storable area and the combined area is determined at the determining.

9. A method of recording same data in a first storage device and a second storage device, the first storage device and the second storage device being formed of a plurality of areas each having a data volume, the method comprising:

first determining whether a storable area is present in the first storage device, the storable area being a combination of a plurality of empty areas having contiguous physical addresses with a total data volume larger than that of a volume of the data;

second determining, when it is determined that no storable area is present in the first storage device, whether a combined area is present in the first storage device, the combined area being a combination of a plurality of backed-up areas storing therein data that has already been stored in the second storage device or a combination of the empty area and the backed-up area, and the combined area having contiguous physical addresses with a total volume larger than or equal to that of the volume of the data;

first storing including:
  storing the data in the storable area, when the first determining determines that the storable area is present in the first storage device; and
  storing the data in the combined area, when the second determining determines that the combined area is present in the first storage device; and second storing including storing the data that has been stored at the first storing as a lump into the second storage device.

10. The method according to claim 9, further comprising acquiring information relating to a physical address and a data volume of each empty area in the first storage device, wherein
the first determining includes determining whether the storable area is present in the first storage device based on the information acquired at the acquiring.

11. The method according to claim 9, wherein if it is determined at the first determining that a plurality of the storable areas are present in the first storage device, the first determining includes selecting a storable area having least data volume from among the storable areas.

12. The method according to claim 9, wherein when it is determined at the determining that no combined area is present in the first storage device,
the first storing includes temporarily storing the data in a temporary data storage until any one of the storable area and the combined area is determined at the determining.

* * * * *